US008671078B2

(12) United States Patent
Zimmerman et al.

(10) Patent No.: US 8,671,078 B2
(45) Date of Patent: Mar. 11, 2014

(54) SHARING PARTS OF A DOCUMENT USING SEARCH FRAMEWORK

(75) Inventors: Josh C. Zimmerman, Boise, ID (US); David Scott Gustafson, Boise, ID (US); Kurt Leonard Ziegler, Boise, ID (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/222,017

(22) Filed: Aug. 31, 2011

(65) Prior Publication Data

US 2013/0054610 A1 Feb. 28, 2013

(51) Int. Cl.
*G06F 17/00* (2006.01)

(52) U.S. Cl.
USPC ........... 707/673; 707/741; 707/739; 709/206; 715/711

(58) Field of Classification Search
USPC .................... 707/609–746; 709/206; 715/711
See application file for complete search history.

(56) References Cited

U.S. PATENT DOCUMENTS

| | | | | |
|---|---|---|---|---|
| 7,860,902 | B2 * | 12/2010 | Brendle et al. | 707/809 |
| 8,082,258 | B2 * | 12/2011 | Kumar et al. | 707/742 |
| 2007/0244901 | A1 * | 10/2007 | Mohler et al. | 707/10 |
| 2008/0071805 | A1 * | 3/2008 | Mourra et al. | 707/100 |
| 2008/0189235 | A1 | 8/2008 | Mital et al. | 706/52 |
| 2009/0089275 | A1 * | 4/2009 | Drory et al. | 707/5 |
| 2010/0036840 | A1 * | 2/2010 | Pitts | 707/5 |
| 2010/0057802 | A1 * | 3/2010 | Mckeeth | 707/734 |
| 2010/0287459 | A1 | 11/2010 | Mital et al. | 715/221 |

OTHER PUBLICATIONS

Yung Chou, Business Intelligence (BI) with Excel Services in SharePoint 2010, Sep. 13, 2010, http://blogstechnet.com/b/sharepointexperts/archive/2010/09/13/business-intelligence-bi-with-excel-services.aspx, 2 pages.
Do It Once, Do It Right, Just pass 70-542-C#!, If you practice these 46 points, Mar. 27, 2011,http://www.ucertify.com/article/do-it-once-do-it-right-just-pass-70-542-c-if-you-practice-these-46-points.html, 2 pages.
Microsoft® Office Excel Services Business Value, Retrieved Apr. 19, 2011, http://www.dwngrpinc.com/docs/BI.Whitepaper.MicrosoftOfficeExcelServicesBusinessValue.pdf, pp. 1-18.

(Continued)

*Primary Examiner* — Tony Mahmoudi
*Assistant Examiner* — Tuan-Khanh Phan
(74) *Attorney, Agent, or Firm* — Tom Wong; Jim Ross; Micky Minhas

(57) ABSTRACT

Embodiments are configured to provide sharing of business logic items. A document may contain business logic items, for example, sets, members, or measures. Some business logic items may be created by a publisher who wants to make the business logic available to other users so that others can access the business logic. Embodiments provide for using an integrated server platform search component to automatically retrieve business logic items which exist in one or more documents stored in a document library. This may allow for a publisher to provide business logic to other users without having to rely on the other users to retrieve the business logic from a specific document, and without requiring the other users to know of the existence of the business logic. Restrictions may be placed so that a publisher can control what specific pieces of business logic may be made available.

20 Claims, 7 Drawing Sheets

(56) References Cited

OTHER PUBLICATIONS

Excel Services and Business Intelligence Features, Office 2007, Retrieved Apr. 19, 2011, http://msdn.microsoft.com/en-us/library/aa980956%28v=office.12%29.aspx, 3 pages.

Kynetix, Technology: Excel Services, Retrieved Apr. 19, 2011, http://kynetix.com/sharepoint/excel.htm, 2 pages.

Moss 2007 Collaboration, Collaboration for Improved Team Productivity, Retrieved Apr. 19, 2011, http://www.frontpages-web-hosting.net/sharepoint-server-hosting/moss-collaboration.asp, 4 pages.

Extentech, ExtenXLS 10 Java Spreadsheet SDK, High Performance SKK for Excel, Retrieved Apr. 19, 2011, http://www.extentech.com/estore/product_detail.jsp?product_group_id=1, 4 pages.

* cited by examiner

MOBILE COMPUTING DEVICE

SHARING PARTS OF A DOCUMENT USING SEARCH FRAMEWORK

BACKGROUND

Current server platforms may provide centralized repositories for sharing documents. These repositories may contain large numbers of various types of documents. Such server platforms provide a search functionality wherein a user provides a set of keywords, and documents containing any similar content are returned. A limitation of this design is that current search functionalities return entire documents as search results when, oftentimes, individual components of the returned documents can be reused instead of the entire document.

Additionally, many times relationships between documents or individual components of documents exist that may be valuable to the user. For example, a workbook in an electronic spreadsheet application, such as Excel®, may contain a piece of business logic in the form of a calculation. A user creating a different workbook may, rather than recreating that business logic or calculation, reuse the existing logic by copying and pasting the business logic from the first workbook into the new workbook. The business logic may be reused in various workbooks or other types of documents. If changes are made to the existing business logic item, the changes may not be communicated to the other workbooks and documents that have reused the same business logic. Current search functionalities do not provide for automatically searching and retrieving shared business logic in various documents in a repository.

It is with respect to these and other considerations that the present invention has been made.

SUMMARY

Embodiments of the present invention solve the above and other problems by providing an automatic sharing and updating of objects within a dependent document based on changes made to an original object. Embodiments are configured to provide an automatic retrieval of business logic for an existing data model in an integrated server platform document library. Business logic items may be shared with other users without having to rely on the other users to retrieve the business logic from a specific document and without requiring the other users to know of the existence of the business logic. Additionally, embodiments provide for an automatic update of modifications made to shared items.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
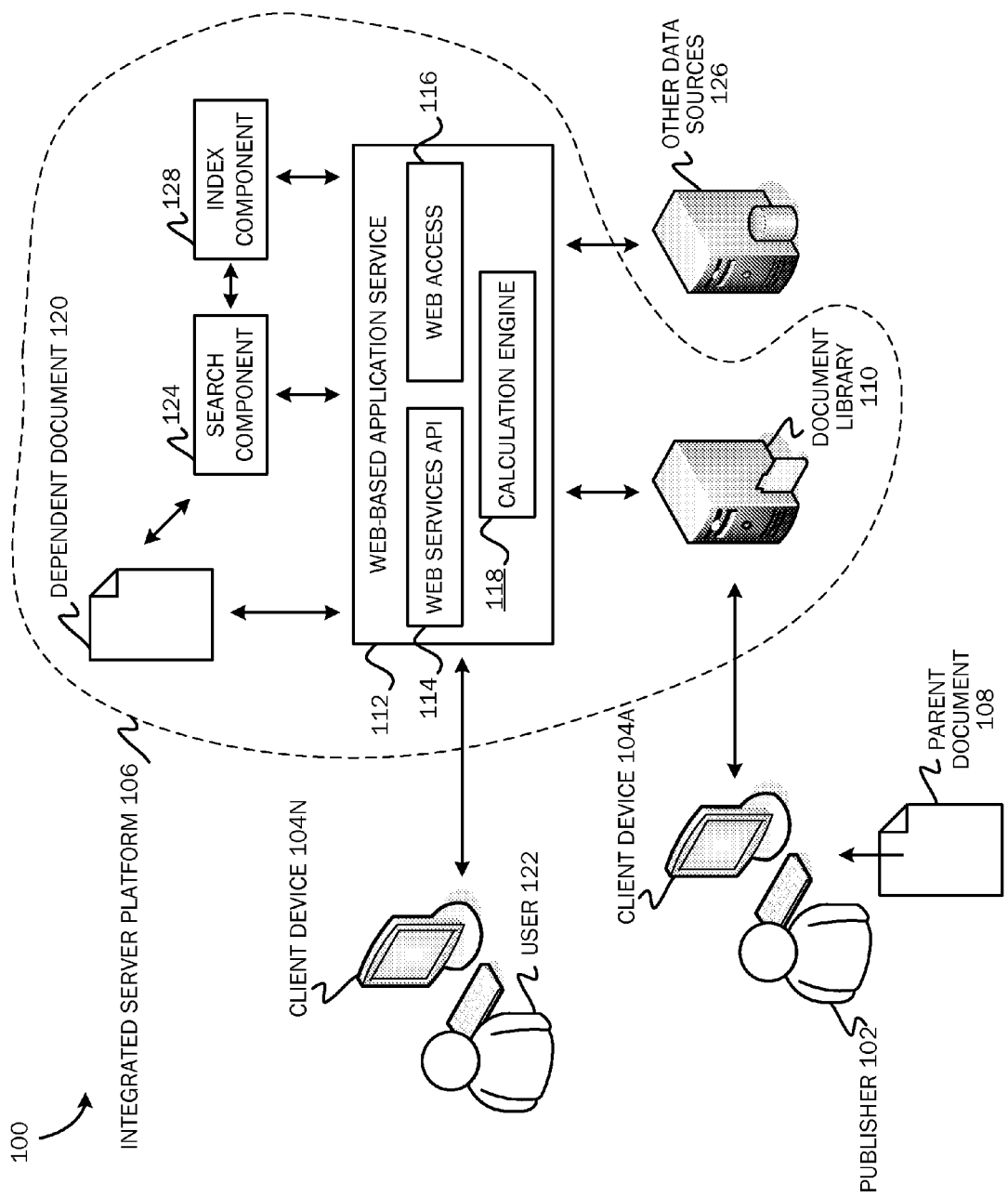
FIG. 1 is a block diagram illustrating an example system for automatically sharing and updating objects within a document.

As briefly described above, embodiments of the present invention are directed to providing a search functionality to automatically retrieve shared business logic items from various documents in a document repository.

According to embodiments, a document may contain business logic items. For example, a spreadsheet may contain sets, members, or measures which can combine cube data, arithmetic operators, numbers, and/or functions. Measures may consist of numbers to which various types of aggregations may be applied (e.g., sum, average, minimum, maximum, etc.). A database may be multi-dimensional wherein multiple independent dimensions may be defined over the data. A collection of dimensions and measures as data structures together with the information inside the structures may be referred to as a cube. A member may be defined as an element within a dimension.

Some business logic objects may be created by an analyst or publisher who wants to make the business logic available to other users so that others can access the business logic. Embodiments provide for using an integrated server platform search component to automatically retrieve business logic items which exist in one or more documents stored in a document library. This may allow for a publisher to provide business logic to other users without having to rely on the other users to retrieve the business logic from a specific document, and without requiring the other users to know of the existence of the business logic. Restrictions may be placed so that a publisher can control what specific pieces of business logic may be made available.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a block diagram illustrating an example system 100 for automatically sharing and updating objects within a dependent document based on changes made to an original object in a parent document. The system 100 illustrates an example integrated server platform, which supports server-side document publishing and calculation, where embodiments may be implemented.

The system 100 includes client devices 104A-N. According to embodiments, client devices 104A-N may be in the form of a variety of acceptable computing devices, for example, a general purpose computing device, personal computer, a laptop computer, a tablet computer, a slate-type computer, a mobile computer, a hand held telephonic computer (e.g., mobile telephone or smart phone), and the like.

User 122 is a person who accesses spreadsheet and database data and functionality through a client application on a client device 104. A publisher 102 may create content containing one or more pieces of shared business logic items, herein referred to as a parent document 108, via a locally installed application. For example, a publisher 102 may create content via a spreadsheet application such as Microsoft Excel®. As should be appreciated, user 122 and publisher 102 may be the same person. Parent documents 108 may be published to an integrated server platform 106, such as Microsoft Office SharePoint® server system. The functionality of the integrated server platform 106 may include web content management, enterprise content services, enterprise search, shared business processes, business intelligence services, and other services. By publishing a parent document 108 to an integrated server platform document library 110, the parent document may be accessible to users 122 and external applications via a web services API 114. The web services API 114 is a component of a web-based application service 112, such as Microsoft Excel Services®. While Microsoft Excel®, Microsoft Office SharePoint®, and Microsoft Excel Services® are used to illustrate a locally installed application, an integrated server platform 106, and a web-based application service 112, embodiments are not limited to these particular products and services. Sharing documents and business logic through a common data store may be implemented in a variety of application programs, database programs, and web services.

The web-based application server 112 may be used for allowing users 122 to view and interact with parent documents 108 and dependent documents 120 using a web browser. A dependent document 120 is a document containing a reference to shared business logic located in a parent document 108. As should be appreciated, a parent document 108 and a dependent document 120 may both be located on a same client device 104. Documents/content connected to other data sources 126 may also be supported. A web-based application service 112, such as Microsoft Excel Services®, may comprise a web services API 114, web access 116, and a calculation engine 118. The web access 116 may be utilized to render documents 108,120 on a web page and allow a user 122 to interact with the documents. The web services API component 114 may provide programmatic access to its web service via XML delivered over web services protocols. Using the web services API component 114, users may be enabled to incorporate server-side business logic into an application, automate an updating of dependent documents 120, and create application-specific user interfaces around server-side business logic data manipulations (e.g., spreadsheet calculations). The integrated server platform (e.g., Microsoft Office SharePoint®) may comprise a search component 124 that may be utilized to crawl, index, and query content. The search component 124 may operate to use a word, words, phrases, concepts, groupings, rules, calculations, and other data to locate relevant files, documents, web pages, and other information.

According to embodiments, documents, such as parent document 108 and dependent document 120, may contain groupings, rules, and calculations, known as business logic. An analyst or publisher 102 may use business logic to build understanding. For example, in a spreadsheet, business logic may be a set, member, or measure which can combine cube data, arithmetic operators, numbers, and/or functions. Some business logic objects may require more programming knowledge to build than an average user may have. For example, creating some business logic may require an analyst who has a deep understanding of a specific data model. Oftentimes, it is desirable to make business logic available to other users so that others can access the business logic, which may be important to understand certain data. Embodiments provide for using an integrated server platform search component 124 to automatically retrieve business logic for a data model which exists in a document 108,120 stored in a document library 110. This may allow for a publisher to provide business logic to other users 122 without having to rely on the other users to retrieve the business logic from a specific document, and without requiring the other users to be aware of the existence of the business logic. Restrictions may be placed so that a publisher 102 can control what specific pieces of business logic may be made available.

Figure 2:
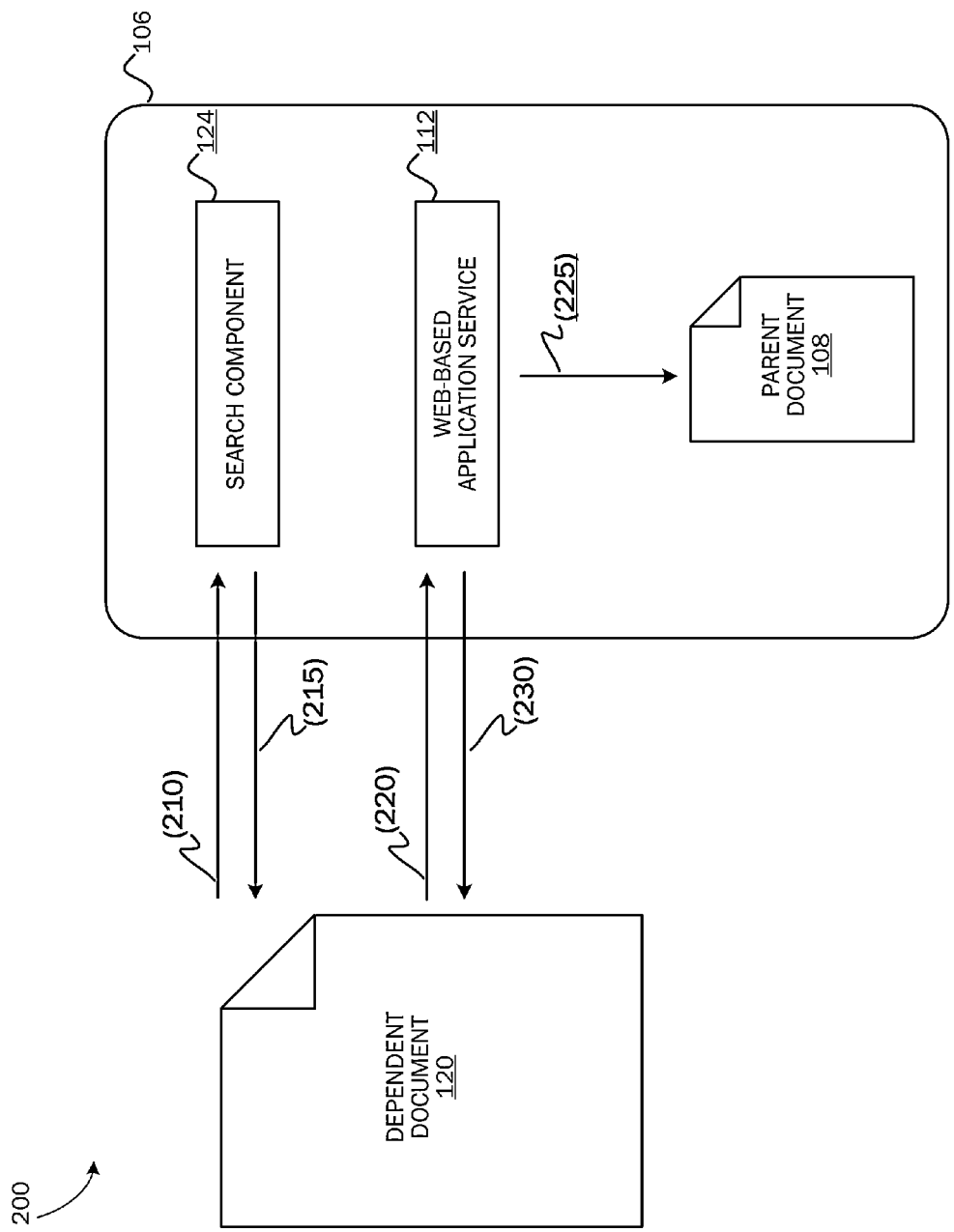
FIG. 2 is a simplified block diagram illustrating an example of how business logic may be shared between documents.

With reference now to FIG. 2, a simplified block diagram illustrating an example of how business logic may be shared between documents 108,120 is provided. A plurality of documents 108,120 may be published to an integrated server platform 106. A document 120 may be created or edited by user 122, and upon a triggering event including, but not limited to, an opening of the document, a manual selection for a data refresh, or an automatically triggered data refresh within the document, a search may be executed (210) for business logic items that may be related to the current document 120.

Upon running a search query (210) on an index component 128 of the integrated server platform 106, a list of documents 108 that have information that may be related to the specific data source may be returned (215). According to embodiments, the index component 128 may be used to index and catalog information. The index component 128 may use metadata, content, and/or other information when indexing against a number of disparate information sources. The index component 128 may be used to identify unique parts of a document that may be of interest to a user. The index component 128 contains identified business logic items and their associated data sources. A unique part of a document that may be of interest to a user may be a business logic item (e.g., a calculated member). According to embodiments, a business logic item may not be shared by default. A business logic item may be identified as shared by a publisher 102. When a business logic item is identified as shared, the business logic item will be associated with a current data source. When a document containing a shared business logic item is published to an integrated server platform 106 (e.g., Microsoft Office SharePoint®), the business logic item and associated data source will be included in the search index component 128.

A business logic item that has been marked as shared may be identified as a connection default item. As should be appreciated, a connection default item is an item that may be automatically provided upon access of an associated data source. That is a connection default item may be automatically added to any document connection using the same data. Rather than a user 122 having to know where to find a document containing a business logic item in a document repository, having to explicitly know where to find a business logic item in a document, or having to open a document and cut and paste a business logic item, the web-based application service 112 uses the search component 124 to automatically perform the search and retrieval from the index component 128 for the user. A request for shared business logic items may be based on a data source. That is, content may be retrieved based on a server name/cube or pivot table document location. The search may not be specific to a data connection file, such as an Office database connection (ODC) file, wherein an ODC file is a file capable of handling database connections and storing data source information, such as the name of a server, connection details, etc. A scope of a search may be based on an integrated server platform site in which an ODC file is currently located. If a search web service 124 is not available at the ODC file location, a client search scope may default to a current document location. According to embodiments, search results for connection default items may be filtered based on data that already exists in the current document 120.

The business logic items found in the search may be presented to the user 122 in the current document 120 (215). A search result object does not contain the business logic item, but contains a reference to a document 108 containing the business logic item. The web-based application service 112 may be used to act as a middle tier for caching and ensuring that a user 122 is able to retrieve the specific business logic item of the document which is needed.

Upon selection of one or more presented business logic items by the user 122, a call is made to the web-based application service 112 to retrieve the one or more selected business logic items from the parent document(s) 108 (220) in which it/they reside. The parent document(s) 108 may then be read out of the document library 110 by the web-based application service 112 (225), and the selected business logic item(s) may be added to the current, now dependent, document 120 (230). In a spreadsheet application, shared business logic items may be available in a field list as well as in navigation capabilities for pivot tables/charts. That is, shared business logic may be displayed and may work like any field, item, or set that has been retrieved directly from a data source.

According to embodiments, a business logic item that is shared and marked as a connection default item may be automatically displayed in a pivot table field list when a user 122 accesses an associated data source. A data source can apply multiple data connections in a document. A business logic item which is retrieved for a specific data source may be applied to all data connections which match the connection properties.

According to embodiments, the web-based application service 112 (e.g., Microsoft Excel Services®) may manage the shared business logic, the document(s) from which the shared business logic originated 108, and the dependent document(s) 120 consuming the shared business logic. For example, the business logic relationships reside on the server 112.

Embodiments provide for an automatic updating of shared business logic. According to embodiments, various events may trigger a document refresh. For example, a triggering event may include an edit to a data element containing shared business logic (e.g., a cell in a spreadsheet containing a shared calculation), an opening of a dependent document 120, or a manual selection for a data refresh. The refresh may execute a search to determine if any shared business logic items have been modified in the parent document(s) 108. Additionally, a search is also executed (210) to find any new business logic items that may have been added to the document library 110 that may be related to the current document 120.

Consider for example, that a user 102 may regularly incorporate a certain paragraph (e.g., a confidentiality clause) into word processing documents (e.g., letters) that he drafts. According to embodiments, a "single version of the truth" of the confidentiality clause may be published in a parent document 108. The parent confidentiality clause may be shared and used in another document 120 drafted by the user and/or another user 122. If the user 102 modifies the parent confidentiality clause, the shared content (i.e., shared confidentiality clause) will be updated in the dependent document 120 when a data connection of the dependent document 120 is refreshed.

Figure 3:
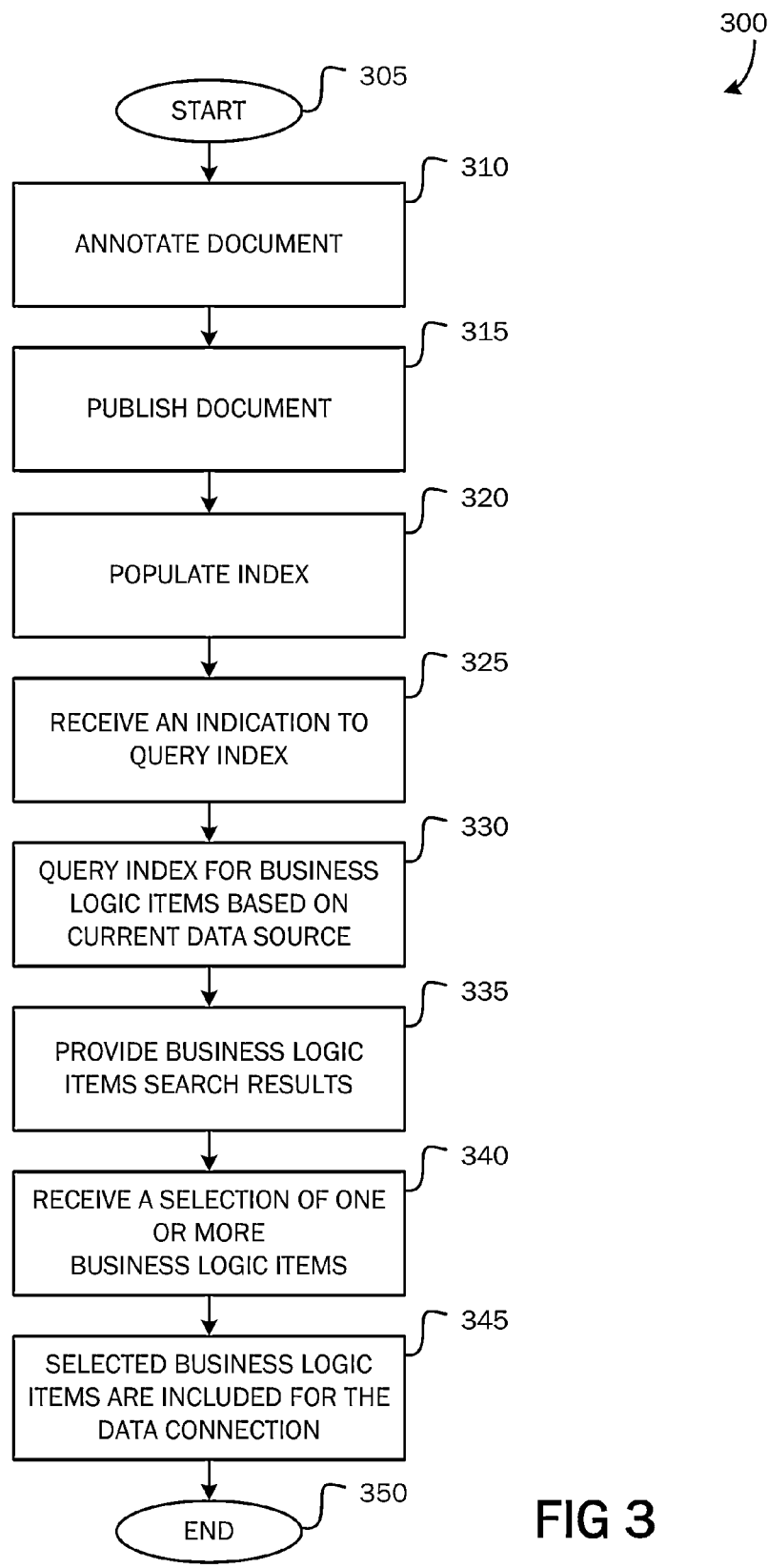
FIG. 3 is a flow diagram illustrating a process of sharing business logic between documents according to an embodiment.

FIG. 3 is a flow diagram illustrating a process 300 of sharing business logic between documents according to an embodiment. The process starts at OPERATION 305, and proceeds to OPERATION 310, where a document 108 containing business logic is annotated. According to embodiments, one or more business logic items may be annotated so that the business logic item(s) may be shared, associated with the current data source, and included in a search index component 128 when the document 108 is published to an integrated server platform 106. A business logic item may be designated as shared so that the item is available to other documents, or may be designated as a connection default item wherein the item may be automatically added to a document connection using the same data, for example, a similar data source.

At OPERATION 315, the document 108 is published to an integrated server platform 106. For example, the document 108 is published to a Microsoft Office SharePoint® server system. Upon publishing a document 108 to the integrated server platform 106 (310), the index component 128 may index and catalog shared business logic items (320). As described above, the index component 128 may use metadata, content, and/or other information when indexing against a number of disparate information sources. The index component 128 may be used to identify unique parts of a document that may be of interest to a user, and may contain identified business logic items and their associated data sources.

At OPERATION 325, an indication to query the index component 128 is received. According to an embodiment, a user 122 may create or edit a document 120 that may use the same data or a similar data source. A document connection refresh may automatically commence a search (330) for connection default business logic items in the index component 128 that may be a match based on the current data source.

According to another embodiment, a user may manually initiate a search for business logic items to pull into a dependent document 120. A user interface element may be provided for allowing a user to search for shared business logic items from other data sources 126 or for shared business logic items stored in the integrated server platform 106 document library 110 that are not marked as connection default items. The user 122 may specify a specific document 108, document library 110, site or site collection (top level site and its children) in which to search for a business logic item. A search (330) may check the specified document 108, document library 110, site or site collection for any business logic which is a match based on the current data source. For example, a user 122 may want to explicitly search for a piece of business logic (e.g., a specific calculation for top ten sales) that he/she thinks may be published in a document library 110. The user 122 may be presented with a dialog where the user may provide user-defined query input (e.g., top ten sales in the U.S. in 2008). The index component 128 may be queried based on the user-defined query input rather than being based on automated objects.

The process 300 proceeds to OPERATION 335, where search results may be provided to the user 122. A list of one or more business logic items may be returned. Upon selection of one or more business logic items from the search results list, a user interface element may be provided to allow the user 122 to add the business logic item(s) to the document connection. Upon receiving a selection to add one or more business logic items to the document connection (340), the selected business logic item(s) are added to the data connection for the current pivot table (345). The process 300 ends at OPERATION 350.

Embodiments provide for updating shared business logic. According to embodiments, business logic item relationship data is maintained by the web-based application service 112 so that if the shared business logic is modified, the changes are automatically updated in dependent documents 120. According to an embodiment, the index component 128 may be updated when a full or an associated partial pass is executed. If a document 108 has been modified, moved, copied, or deleted, the index component 128 may be populated with the updated information.

Connection default items may be refreshed with data connection refreshes. The search component 124 may check the integrated server platform 106 site for any connection default items for all data connections. If updates or additions are found, the uniform resource identifier (URI) for currently cached items may be replaced in the document 120 or user profile. The web-based application service 112 may be queried to extract the business logic items from each of the documents 108. In-memory objects may be updated for use in the field list. According to an embodiment, a document 120 may contain a current status of shared business logic for each data connection. Status information may be updated when a published document file is crawled in the integrated server platform 106 site.

References to unique business logic items may be maintained by various pieces of information which may include a relative path of the parent document 108 site collection (e.g., /sites/site/dc/workbook1.xlsx), an internal data connection, an item name for the shared business logic item (e.g., set1), and an identifier, which may be generated when a business logic item is shared in a document. The identifier may be used for repairing a reference that may no longer be available.

According to an embodiment, a user interface element may be provided, which when selected, may allow a user to delete cached shared business logic and refresh any items which may be out of date. A list of documents and shared sets may include items associated with the current document data connection. The user may be enabled to configure an individual business logic item or an entire document's business logic to be removed from a field well. A user may be able to manually refresh business logic which may exist outside of the integrated server platform 106.

Figure 4:
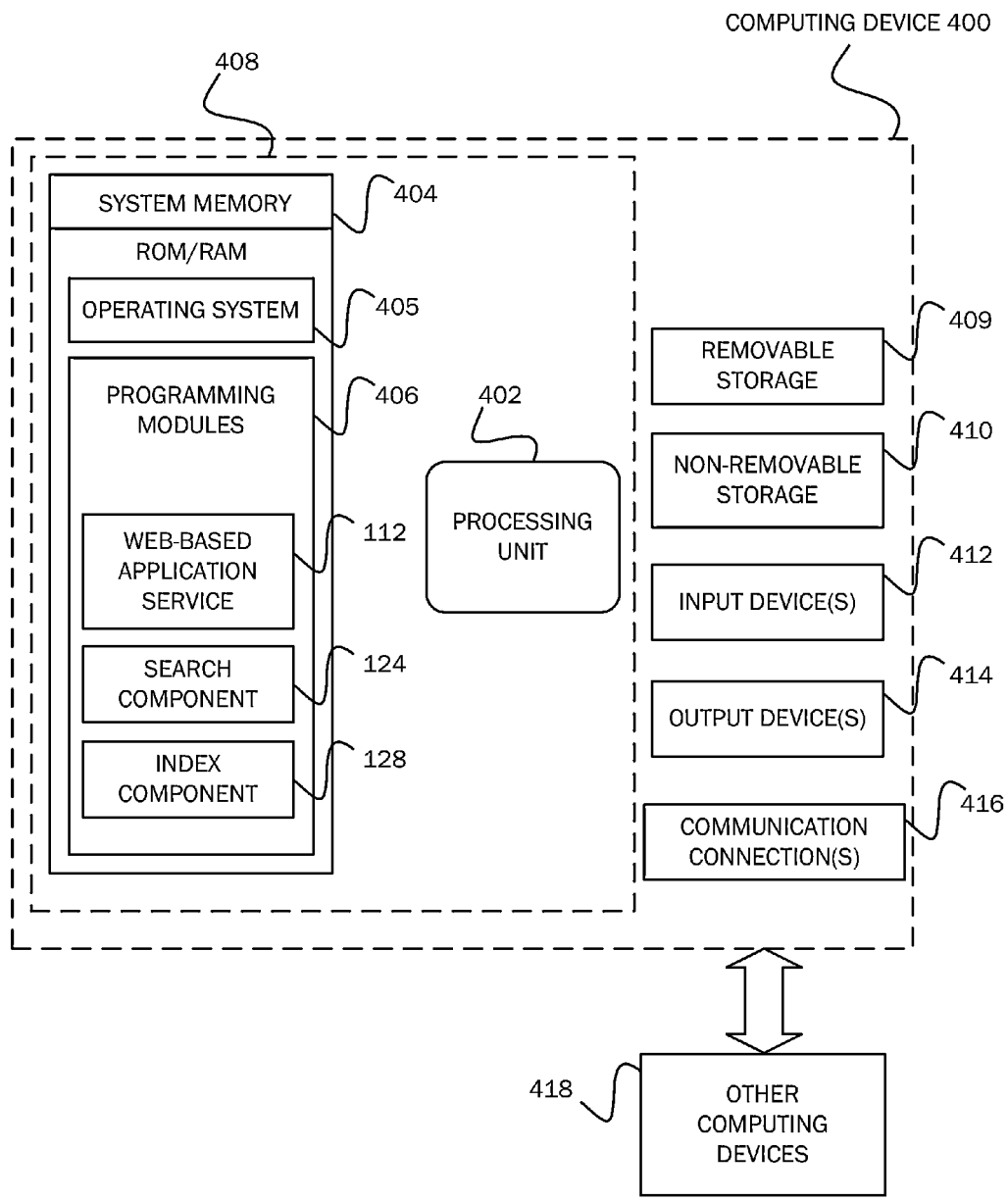
FIG. 4 is a block diagram illustrating example physical components of a computing device with which embodiments of the invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating example physical components of a computing device 400 with which embodiments of the invention may be practiced. The computing device components described below may be suitable for the computing devices described above, for example, client devices 104A-N and computer devices operating as part of the integrated server platform 106. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a web-based application service 112, a search component 124, and an index component 128. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410.

As stated above, a number of program modules and data files may be stored in system memory 404, including operating system 405. While executing on processing unit 402, programming modules 406, such as the web based application service 112, the search component 124, and the index component 128 may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to search application 420 may be operated via application-specific logic integrated with other components of the computing device/system 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
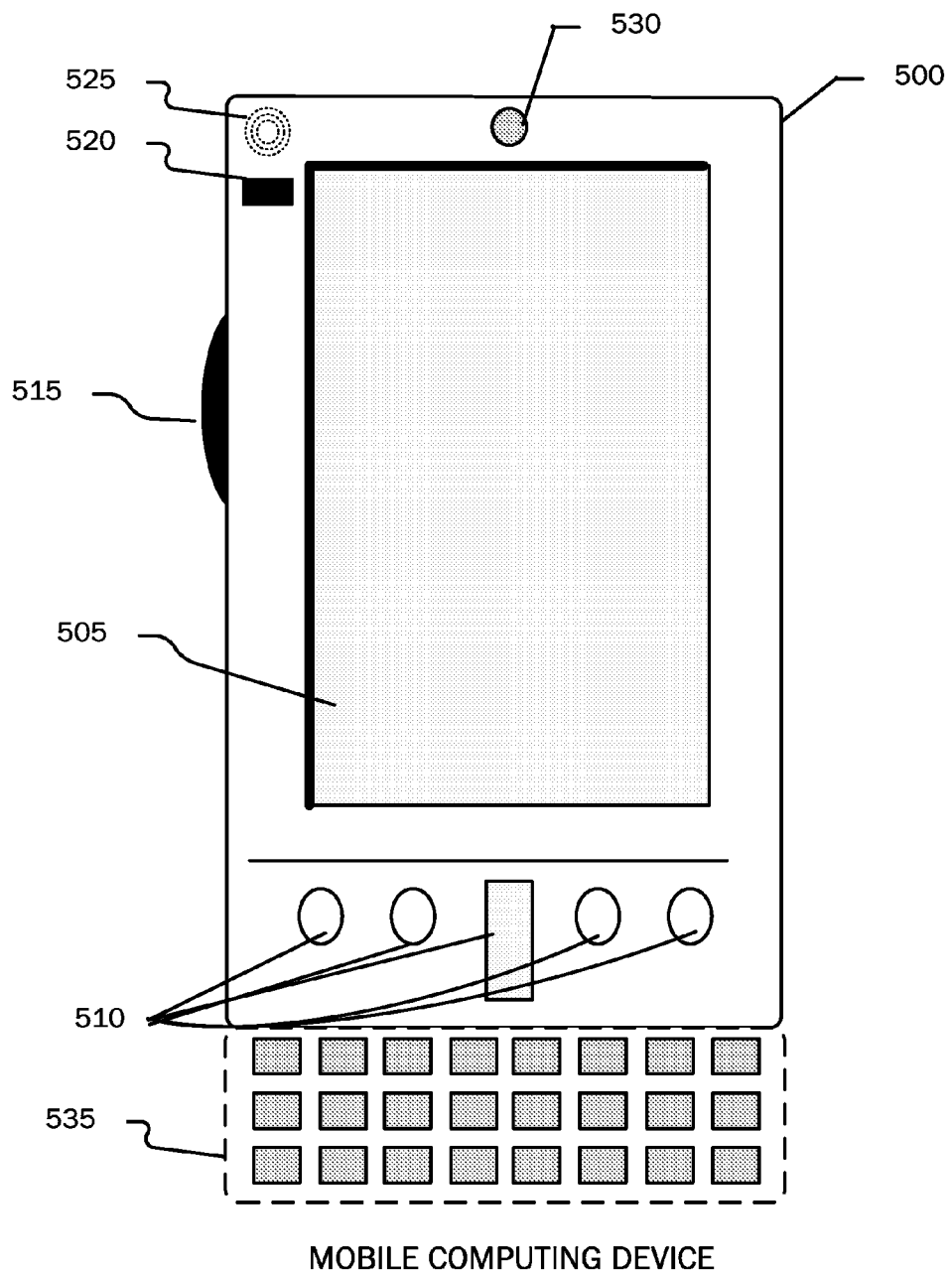
FIGS. 5A and 5B are simplified block diagrams of a mobile computing device with which embodiments of the present invention may be practiced.
Figure 5B:
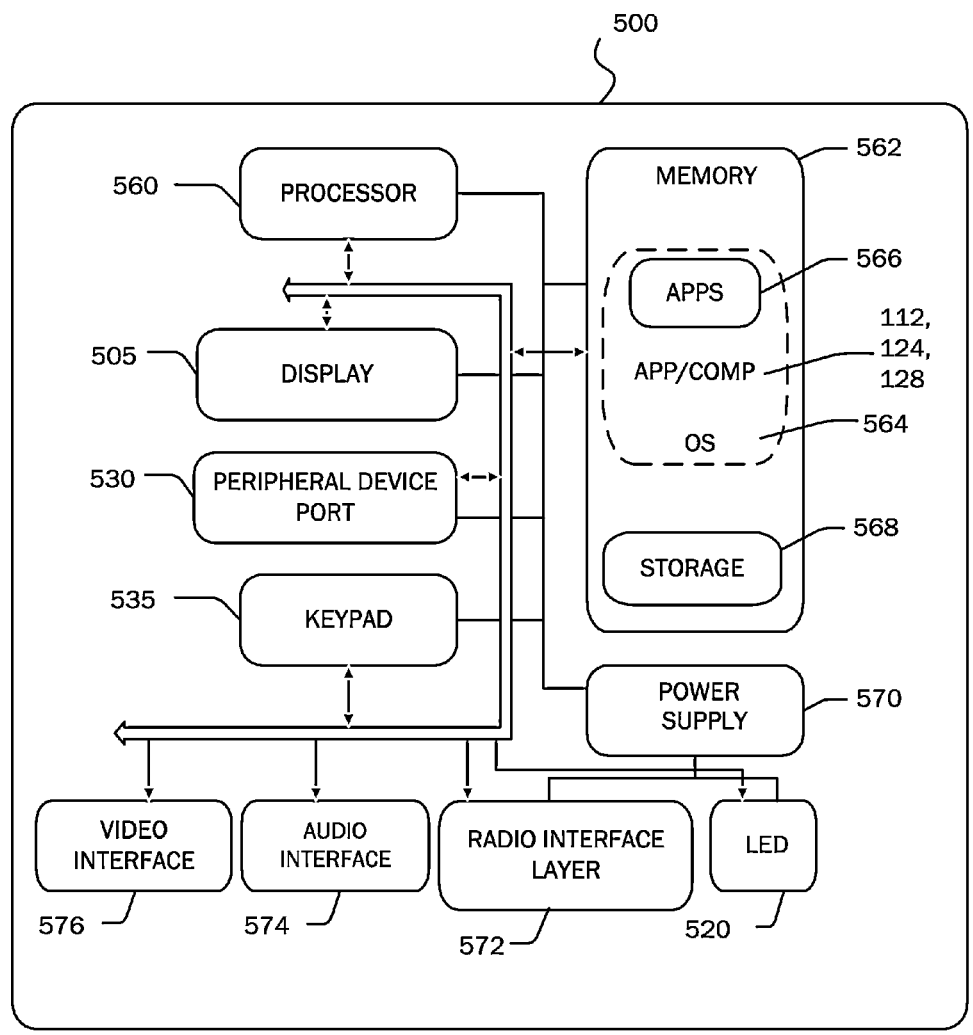
Figure 6:
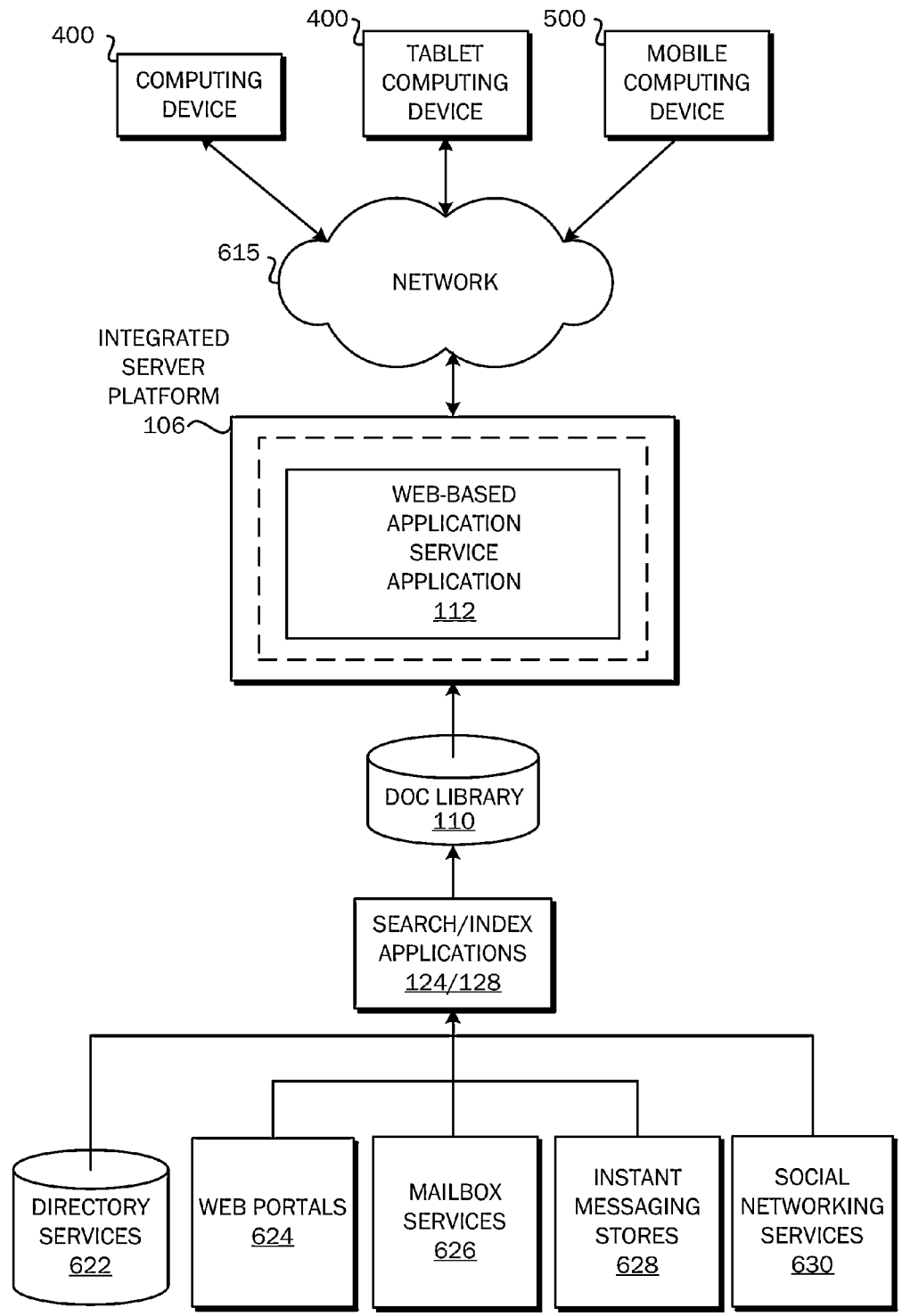
FIG. 6 is a simplified block diagram of a distributed computing system in which embodiments of the present invention may be practiced.

FIGS. 5A and 5B illustrate a suitable mobile computing environment, for example, a mobile telephone 500, a smartphone, a tablet personal computer, a laptop computer, and the like, with which embodiments of the invention may be practiced. With reference to FIG. 5A, an example mobile computing device 500 for implementing the embodiments is illustrated. In a basic configuration, mobile computing device 500 is a handheld computer having both input elements and output elements. Input elements may include touch screen display 505 and input buttons 515 that allow the user to enter information into mobile computing device 500. Mobile computing device 500 may also incorporate an optional side input element 515 allowing further user input. Optional side input element 515 may be a rotary switch, a button, or any other type of manual input element. In alternative embodiments, mobile computing device 500 may incorporate more or less input elements. For example, display 505 may not be a touch screen in some embodiments. In yet another alternative embodiment, the mobile computing device is a portable phone system, such as a cellular phone having display 505 and input buttons 515. Mobile computing device 500 may also include an optional keypad 535. Optional keypad 535 may be a physical keypad or a "soft" keypad generated on the touch screen display.

Mobile computing device 500 incorporates output elements, such as display 505, which can display a graphical user interface (GUI). Other output elements include speaker 525 and LED light 520. Additionally, mobile computing device 500 may incorporate a vibration module (not shown), which causes mobile computing device 500 to vibrate to notify the user of an event. In yet another embodiment, mobile computing device 500 may incorporate a headphone jack (not shown) for providing another means of providing output signals.

Although described herein in combination with mobile computing device 500, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 5B is a block diagram illustrating components of a mobile computing device used in one embodiment, such as the computing device shown in FIG. 5A. That is, mobile computing device 500 can incorporate system 502 to implement some embodiments. For example, system 502 can be used in implementing a "smart phone" that can run one or more applications similar to those of a desktop or notebook computer such as, for example, browser, e-mail, scheduling, instant messaging, and media player applications. In some embodiments, system 502 is integrated as a computing device, such as an integrated personal digital assistant (PDA) and wireless phone.

One or more application programs 566 may be loaded into memory 562 and run on or in association with operating system 564. Examples of application programs include phone dialer programs, e-mail programs, PIM (personal information management) programs, word processing programs, spreadsheet programs, Internet browser programs, messaging programs, and so forth. System 502 also includes non-volatile storage 568 within memory 562. Non-volatile storage 568 may be used to store persistent information that should not be lost if system 502 is powered down. Applications 566 may use and store information in non-volatile storage 568, such as e-mail or other messages used by an e-mail application, and the like. A synchronization application (not shown) also resides on system 502 and is programmed to interact with a corresponding synchronization application resident on a host computer to keep the information stored in non-volatile storage 568 synchronized with corresponding information stored at the host computer. As should be appreciated, other applications may be loaded into memory 562 and run on the device 500, including a search web-based application service 112, a search component 124, and an index component 128, described herein.

System 502 has a power supply 570, which may be implemented as one or more batteries. Power supply 570 might further include an external power source, such as an AC adapter or a powered docking cradle that supplements or recharges the batteries.

System 502 may also include a radio 572 that performs the function of transmitting and receiving radio frequency communications. Radio 572 facilitates wireless connectivity between system 502 and the "outside world", via a communications carrier or service provider. Transmissions to and from radio 572 are conducted under control of OS 564. In other words, communications received by radio 572 may be disseminated to application programs 566 via OS 564, and vice versa.

Radio 572 allows system 502 to communicate with other computing devices, such as over a network. Radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 502 is shown with two types of notification output devices; LED 520 that can be used to provide visual notifications and an audio interface 574 that can be used with speaker 525 to provide audio notifications. These devices may be directly coupled to power supply 570 so that when activated, they remain on for a duration dictated by the notification mechanism even though processor 560 and other components might shut down for conserving battery power. LED 520 may be programmed to remain on indefinitely until the user takes action to indicate the powered-on status of the device. Audio interface 574 is used to provide audible signals to and receive audible signals from the user. For example, in addition to being coupled to speaker 525, audio interface 574 may also be coupled to a microphone to receive audible input, such as to facilitate a telephone conversation. In accordance with embodiments of the present invention, the microphone 520 may also serve as an audio sensor to facilitate control of notifications, as will be described below. System 502 may further include video interface 576 that enables an operation of on-board camera 530 to record still images, video stream, and the like.

A mobile computing device implementing system 502 may have additional features or functionality. For example, the device may also include additional data storage devices (removable and/or non-removable) such as, magnetic disks, optical disks, or tape. Such additional storage is illustrated in FIG. 5B by storage 568. Computer storage media may include volatile and nonvolatile, removable and non-removable media implemented in any method or technology for storage of information, such as computer readable instructions, data structures, program modules, or other data.

Data/information generated or captured by the device 500 and stored via the system 502 may be stored locally on the device 500, as described above, or the data may be stored on any number of storage media that may be accessed by the device via the radio 572 or via a wired connection between the device 500 and a separate computing device associated with the device 500, for example, a server computer in a distributed computing network, such as the Internet. As should be appreciated such data/information may be accessed via the device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates a system architecture for providing communications and content associated with a web-based application service 112, as described above. Content developed, interacted with or edited in association with a web-based application service 112 may be stored in different communication channels or other storage types. For example, various content items along with information from which they are developed may be stored using directory services 622, web portals 624, mailbox services 626, instant messaging stores 628 and social networking sites 630. The web-based application service 112, the search component 124, and the index component 128 may use any of these types of systems or the like for enabling automatic sharing of business logic, as described herein. An integrated server platform 106 may provide content items to clients. As one example, integrated server platform 106 may be a web server providing content over the web. Integrated server platform 106 may provide content over the web to clients through a network 615. Examples of clients that may obtain content include computing device 400, which may include any general purpose personal computer 400, a tablet computing device and/or mobile computing device 500 which may include smart phones. Any of these devices may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for sharing business logic items, the method comprising:
   receiving an annotation associated with one or more business logic items in a first document, the annotation designating the one or more business logic items as a connection default business logic item;
   generating an identifier for each of the one or more annotated connection default business logic items, the identifier being generated when the one or more annotated connection default business logic items are shared in a document;
   publishing the first document to an integrated server platform document library;
   populating an index component with the one or more annotated business logic items and associated identifiers, the index component being utilized to index and catalog shared business logic items, the index component using one or more of metadata, content and other information when indexing against one or more disparate information sources, the index component being further utilized to identify unique document parts;
   querying the index component for connection default business logic items related to a second document;
   automatically storing the related connection default business logic items in the first document for access by the second document; and
   maintaining references to unique business logic items, the references comprising at least a relative path of a parent document site collection and the identifier, the identifier being utilized to repair a reference that is no longer available, the identifier being separate from the relative path.

2. The method of claim 1, further comprising:
   receiving a selection of one or more of the related connection default business logic items;
   reading the first document containing the one or more selected connection default business logic items from the integrated server platform document library;
   providing the one or more selected connection default business logic items to the second document; and
   maintaining connection default business logic item relationship data and identifiers.

3. The method of claim 1, wherein receiving an annotation associated with one or more business logic items in a first document, the annotation designating the one or more business logic items as a connection default business logic item allows the business logic item to be automatically added to a document connection using similar data.

4. The method of claim 3, wherein publishing the document to the integrated server platform document library enables connection default behavior.

5. The method of claim 1, wherein querying the index component for connection default business logic items related to the second document is in response to a triggering event, the triggering event including a data refresh of the second document or a manual selection to search for related connection default business logic items.

6. The method of claim 1, further comprising:
   receiving an annotation associated with one or more business logic items in the first document, the annotation designating the one or more business logic items as a shared business logic item;
   generating an identifier for each of the one or more annotated shared business logic items;
   populating the index component with the one or more annotated shared business logic items and associated identifiers;
   receiving a query input to search for related shared business logic items;
   querying the index component for related shared business logic items;
   providing a list of one or more search results of related shared business logic items;
   receiving a selection of one or more of the one or more search results of related shared business logic items;
   reading the first document containing the one or more related shared business logic items from the integrated server platform document library;
   providing the one or more selected shared business logic items to the second document; and
   maintaining shared business logic item relationship data and identifiers.

7. The method of claim 1, wherein receiving an annotation associated with one or more business logic items in a first document, the annotation designating the one or more business logic items as a shared business logic item allows the business logic item to be available to other documents.

8. The method of claim 1, further comprising receiving an indication that a business logic item has been modified in the first document and populating the index component with the modified business logic item.

9. The method of claim 8, further comprising:
   receiving an indication of a document connection refresh of the second document;

querying the index component for new related connection default business logic items and modified business logic items; and updating the second document with any new related connection default business logic items and modified business logic items.

10. The method of claim 1, wherein a business logic item includes text, a grouping, a rule, a calculation, a set, a member, or a measure.

11. A system for providing sharing of business logic items, the system comprising:
a memory for storing executable program code; and
a processor, functionally coupled to the memory, the processor being responsive to computer-executable instructions contained in the program code and operative to:
provide application functionality to a user to create, access, and edit a first document, the first document including one or more business logic items;
receiving an annotation associated with one or more business logic items in the first document, the annotation designating the one or more business logic items as a connection default business logic item or a shared business logic item;
generate an identifier for each of the one or more annotated connection default business logic items and shared business logic items;
publish the first document to an integrated server platform document library;
automatically store the related connection default business logic items in the first document for access by the second document;
crawl documents stored in an integrated server platform document library for annotated business logic items;
populate an index component with the one or more annotated business logic items and associated identifiers, the index component being utilized to index and catalog shared business logic items, the index component using one or more of metadata, content and other information when indexing against one or more disparate information sources, the index component being further utilized to identify unique document parts;
query the index component for connection default business logic items related to second document based on a data source of the second document; and
maintain references to unique business logic items, the references comprising at least a relative path of a parent document site collection and the identifier, the identifier being utilized to repair a reference that is no longer available, the identifier being separate from the relative path.

12. The system of claim 11, wherein the processor is further operable to:
read the first document containing the one or more selected connection default business logic items from the integrated server platform document library upon receiving an indication that one or more of the related connection default business logic items has been selected;
provide the one or more selected connection default business logic items to the second document;
maintain connection default business logic item relationship data and identifiers;
receive an indication that a business logic item in the first document has been modified; and
provide the second document with the modified connection default business logic item.

13. The system of claim 11, wherein an annotation associated with one or more business logic items in a first document, the annotation designating the one or more business logic items as a connection default business logic item or a shared business logic item allows the business logic item to be automatically added to a document connection using similar data.

14. The system of claim 13, wherein connection default behavior is enabled when a document is published to the integrated server platform document library.

15. The system of claim 11, wherein to query the index component for connection default business logic items related to second document based on a data source of the second document is in response to a triggering event, the triggering event including a data refresh of the second document or a manual selection to search for related connection default business logic items.

16. The system of claim 11, wherein the processor is further operable to:
receive a query input to search for related shared business logic items;
query the index component for related shared business logic items; and
provide a list of one or more search results of related shared business logic items.

17. The system of claim 11, wherein the processor is further operable to:
receive an indication that one or more of the one or more search results of related shared business logic items has been selected;
read the first document containing the one or more selected related shared business logic items from the integrated server platform document library;
provide the one or more selected shared business logic items to the second document; and
maintain shared business logic item relationship data and identifiers.

18. A computer-readable storage device storing computer-executable instructions which when executed by a computer perform a method for sharing business logic items, the method comprising:
receiving an annotation associated with one or more business logic items in a first document, the annotation designating the one or more business logic items as a shared business logic item;
generating an identifier for each of the one or more annotated shared business logic items;
publishing the first document to an integrated server platform document library;
populating an index component with the one or more annotated shared business logic items and associated identifiers, the index component being utilized to index and catalog shared business logic items, the index component using one or more of metadata, content and other information when indexing against one or more disparate information sources, the index component being further utilized to identify unique document parts;
receiving a query input to search for related shared business logic items;
querying the index component for related shared business logic items;
providing a list of one or more search results of related shared business logic items; and
maintaining references to unique business logic items, the references comprising at least a relative path of a parent document site collection and the identifier, the identifier being utilized to repair a reference that is no longer available, the identifier being separate from the relative path.

19. The computer readable storage device of claim 18, the method further comprising:
   receiving a selection of one or more of the one or more search results of related shared business logic items;
   reading the first document containing the one or more related shared business logic items from the integrated server platform document library;
   providing the one or more selected shared business logic items to the second document;
   maintaining shared business logic item relationship data and identifiers;
   receiving an indication that a shared business logic item has been modified in the first document;
   populating the index component with the modified shared business logic item;
   receiving an indication of a document connection refresh of the second document;
   querying the index component for modified business logic items; and
   updating the second document with any new modified shared business logic items.

20. The computer readable storage device of claim 18, the method further comprising:
   receiving an annotation associated with one or more business logic items in the first document, the annotation designating the one or more business logic items as a connection default business logic item;
   generating an identifier for each of the one or more annotated connection default business logic items;
   populating an index component with the one or more annotated connection default business logic items and associated identifiers;
   querying the index component for connection default business logic items related to a second document; and
   automatically storing the related connection default business logic items in the first document for access by the second document;
   receiving a selection of one or more of the related connection default business logic items;
   reading the first document containing the one or more selected connection default business logic items from the integrated server platform document library;
   providing the one or more selected connection default business logic items to the second document;
   maintaining connection default business logic item relationship data and identifiers;
   receiving an indication that a connection business logic item has been modified in the first document;
   populating the index component with the modified connection business logic item;
   receiving an indication of a document connection refresh of the second document;
   querying the index component for new related connection default business logic items and modified connection default business logic items; and
   updating the second document with any new related connection default business logic items and modified connection default business logic items.

* * * * *